United States Patent [19]

Suzuki

[11] Patent Number: 5,430,712
[45] Date of Patent: Jul. 4, 1995

[54] EQUALIZING METHOD AND APPARATUS

[75] Inventor: Mitsuhiro Suzuki, Tokyo, Japan

[73] Assignee: Sony Corporation, Japan

[21] Appl. No.: 947,835

[22] Filed: Sep. 21, 1992

[30] Foreign Application Priority Data

Sep. 26, 1991 [JP] Japan .................. 3-273563

[51] Int. Cl.⁶ ........................................ H04B 7/005
[52] U.S. Cl. ................... 370/32; 370/100.1; 375/231
[58] Field of Search ............ 370/32, 77, 79.100.1, 370/105.4; 333/18; 375/13

[56] References Cited

U.S. PATENT DOCUMENTS

| | | | |
|---|---|---|---|
| 5,050,186 | 9/1991 | Gurcan et al. | 375/12 X |
| 5,155,742 | 10/1992 | Ariyavisitakul et al. | 375/13 |
| 5,182,749 | 1/1993 | Kazecki et al. | 370/100.1 |
| 5,257,265 | 10/1993 | Su et al. | 370/100.1 |

FOREIGN PATENT DOCUMENTS 2247812  3/1992  United Kingdom ............ 375/13

*Primary Examiner*—Melvin Marcelo
*Attorney, Agent, or Firm*—Ronald P. Kananen

[57] ABSTRACT

A method and an apparatus for equalizing received transmission signals including at least a sync word and arbitrary data in a slot is disclosed. Data of a current slot are equalized in a reverse direction, using a sync word of a slot next to the current slot to be equalized. Data downstream of an error site under an extremely adverse condition may be equalized even if such error site exists in the slot being equalized.

5 Claims, 5 Drawing Sheets

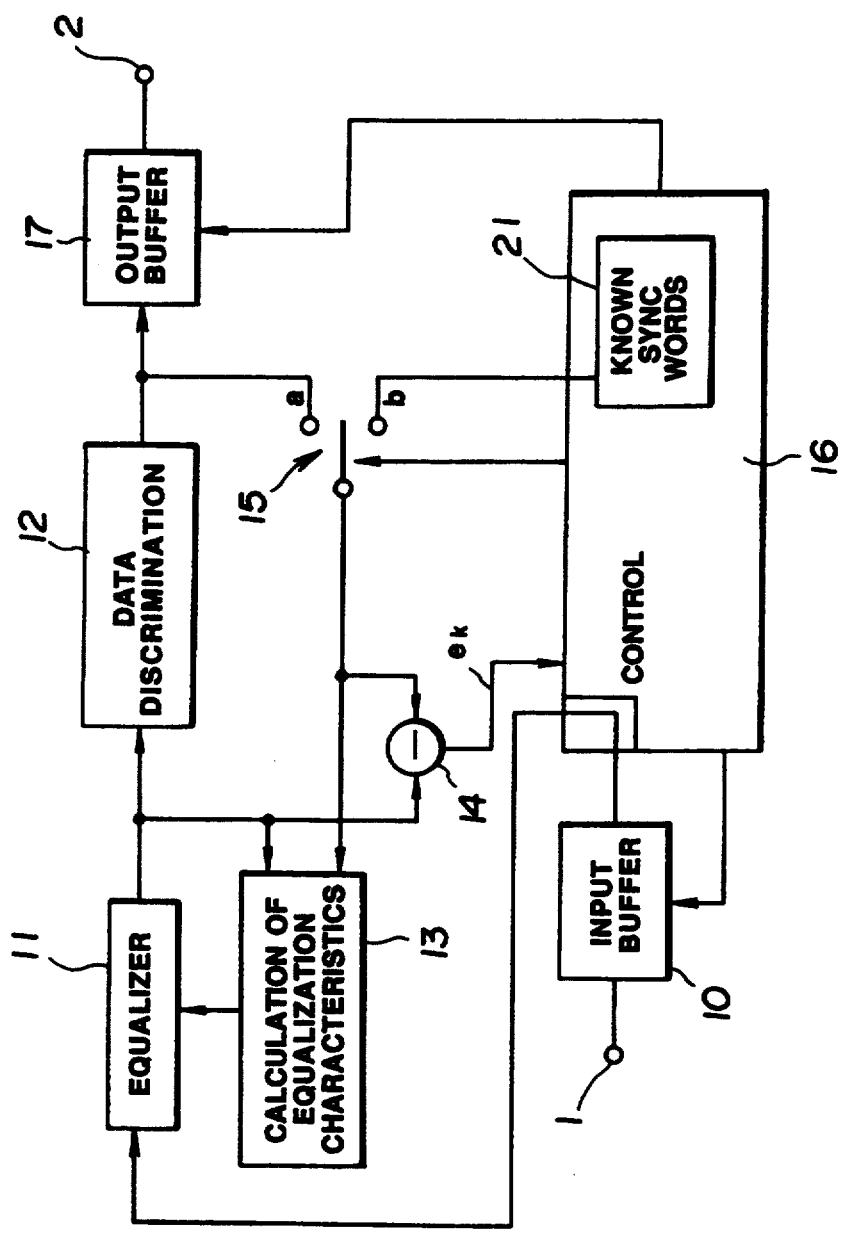

EQUALIZING METHOD AND APPARATUS

BACKGROUND OF THE INVENTION

1. Field of the Invention

This invention relates to a method and an apparatus for equalizing received transmission signals containing at least a sync word and arbitrary data in each slot such as in a time division multiple access (TDMA) system.

2. Description of the Prior Art

Among available digital communication systems for transmitting signals containing at least a sync word and arbitrary data in each slot are time division multiple access (TDMA) systems in which a large number of stations may transmit signals with the same carrier frequency to a relay unit for mutual communication so that signals do not temporally overlap each other. That is, a TDMA frame (a predetermined time length), which is a basic period for signal transmission and reception, is set and communication with a called station is carried out using an allocated pair of time positions (time slots) within the TDMA frame. Therefore, it is necessary for each station to transmit signals in an allocated time slot within the frame and to effect time position control (burst synchronization control) so that the transmitted signals do not "collide" with other transmitted signals. It is also necessary for each station to obey the time reference of a reference station to control the time position of transmitted burst signals so that burst signals transmitted by the stations do not collide against one another. In general, such burst synchronization control and compression and expansion of the transmission signals at the transmitting station and at the receiving station, respectively, are characteristic of TDMA communication.

Among applications of the above-described TDMA system are car telephone systems.

As shown in FIG. 1, in car telephone systems, each frame contains six slots for a frequency band. Each frame is made up of 1944 bits (972 symbols) and is 40 ms long. In other words, there are 25 frames per second.

Each slot in each frame has a format consisting of a 6-bit guard time (G), a 16-bit data slot, a 28-bit (14-symbol) sync word, a 122-bit data slot, a 12-bit slow associated control channel (SACCH) and a coded digital verification color code (CDVCC), as shown at A in FIG. 2, or a format consisting of a 28-bit (14-symbol) sync word, a 12-bit SACCH, a 130-bit data slot, a 12-bit CDVCC, a 130-bit data slot and 12-bit reserved slot for bits 00 . . . 00 (RSVD), as shown at B in FIG. 2. These formats are slot formats used when transmitting from a base station to a car telephone terminal.

Meanwhile, when receiving the slots transmitted from the car telephone system, an equalization process is usually carried out for signals received in each slot.

For equalizing a reception slot, that is of a current slot, of the slot format used when transmitting from a base station to a car telephone terminal, as shown at B in FIG. 2, the processing of equalization is started at the sync word which is positioned at the leading end of the reception slot. On the other hand, 162 symbols per reception slot means a reception slot period of approximately 6.7 ms which is fairly long with respect to fading at a vehicle speed of approximately 100 km/h. Under such conditions, the transmission channel characteristics may fluctuate considerably from one reception slot to another.

Therefore, should any errors be present somewhere within the reception slot, such as in its data area, it may frequently occur that the equalization process cannot be carried out downstream of the error site, so that the risk is high that data downstream of the error site will be lost in its entirety.

Because, under such circumstances, information for identifying the transmission channel cannot be correctly obtained, the characteristics of the subsequent operations may deteriorate.

OBJECT AND SUMMARY OF THE INVENTION

In view of the above-described status of the art, it is an object of the present invention to provide a method and an apparatus for equalization in which, even though a position in a reception slot (e.g., one containing data) is in an extremely adverse condition exists in a reception slot, it becomes possible to equalize the data downstream of this position.

For accomplishing the above object, the present invention provides a method for equalizing received transmission signals including at least a sync word and arbitrary data in a slot, comprising equalizing data of a current slot in a reverse direction using a sync word of the slot subsequent to the slot which is being equalized.

Even though a position with an extremely adverse state (i.e., an error site) exists in the reception slot being equalized, data downstream of the error site may be equalized, in accordance with the equalizing method of the present invention, thereby minimizing the risk of data losses.

The present invention also provides a method for equalizing received transmission signals comprising a first initializing step of initializing an equalizing operation using a sync word of a current slot, a forward equalizing step comprising starting the equalization from a position of said sync word, the step of discontinuing the forward equalization and error detection as soon as an error site is found, a second initializing step comprising initializing using a sync word of the next slot subsequent to the current slot, a reverse equalization step comprising equalizing from the trailing end of said current slot, and a connecting step comprising connecting equalized data from the forward equalization step and equalized data from the reverse equalization step.

According to the present invention, data of the current slot may be equalized in the reverse direction by employing the sync word of the slot next to the current slot which is being equalized.

That is (referring to FIG. 3), with the method and the apparatus for equalization according to the present invention, by equalizing data of the current slot $ST_P$ in the reverse direction by employing the sync word $CW_N$ of the slot $ST_N$ next to the current slot, data downstream of data which is in an extremely adverse state, that is error data, may be equalized, so that the quantity of data loss may be minimized.

BRIEF DESCRIPTION OF THE DRAWINGS

FIG. 5 is a block diagram showing a concrete arrangement for carrying out the equalizing method shown in FIGS. 3 and 4.

DESCRIPTION OF THE PREFERRED EMBODIMENT

Figure 1:
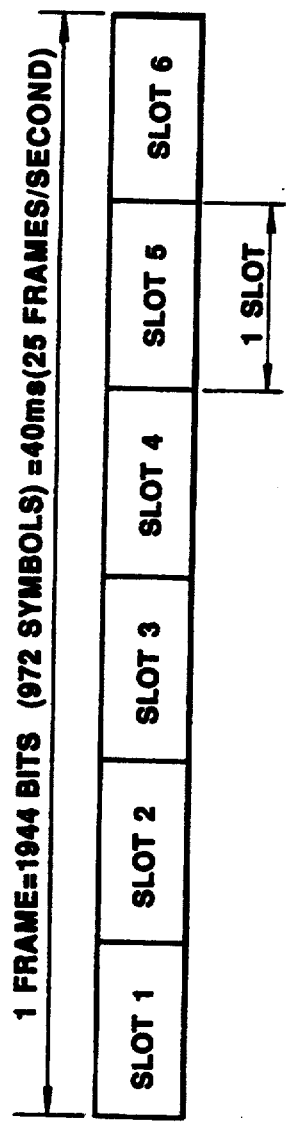
FIG. 1 is a diagrammatic view showing a construction of each frame.

Referring to the drawings, a preferred embodiment according to the present invention will be explained in detail.

Figure 2:
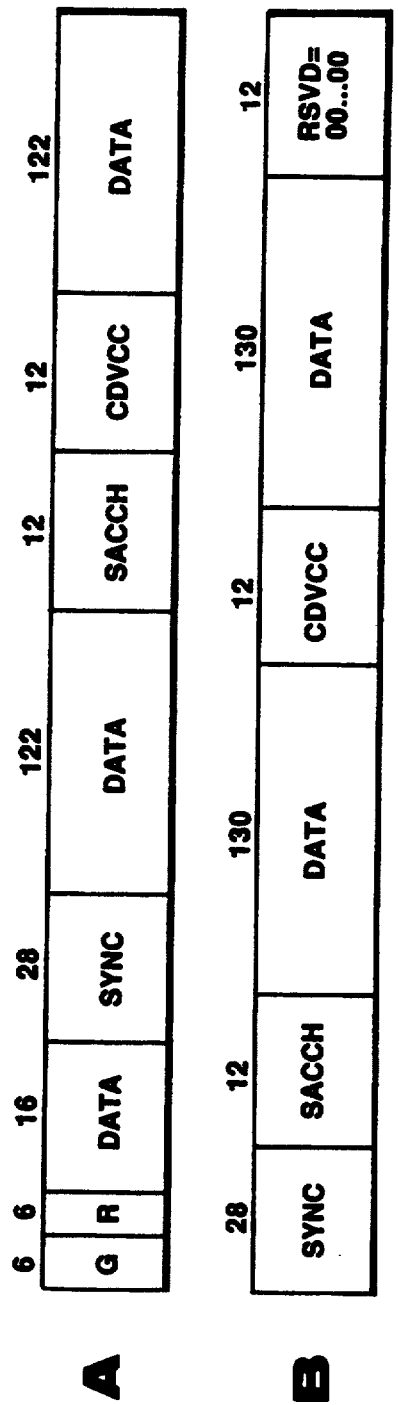
FIG. 2 is a diagrammatic view showing a format of each slot.
Figure 3:
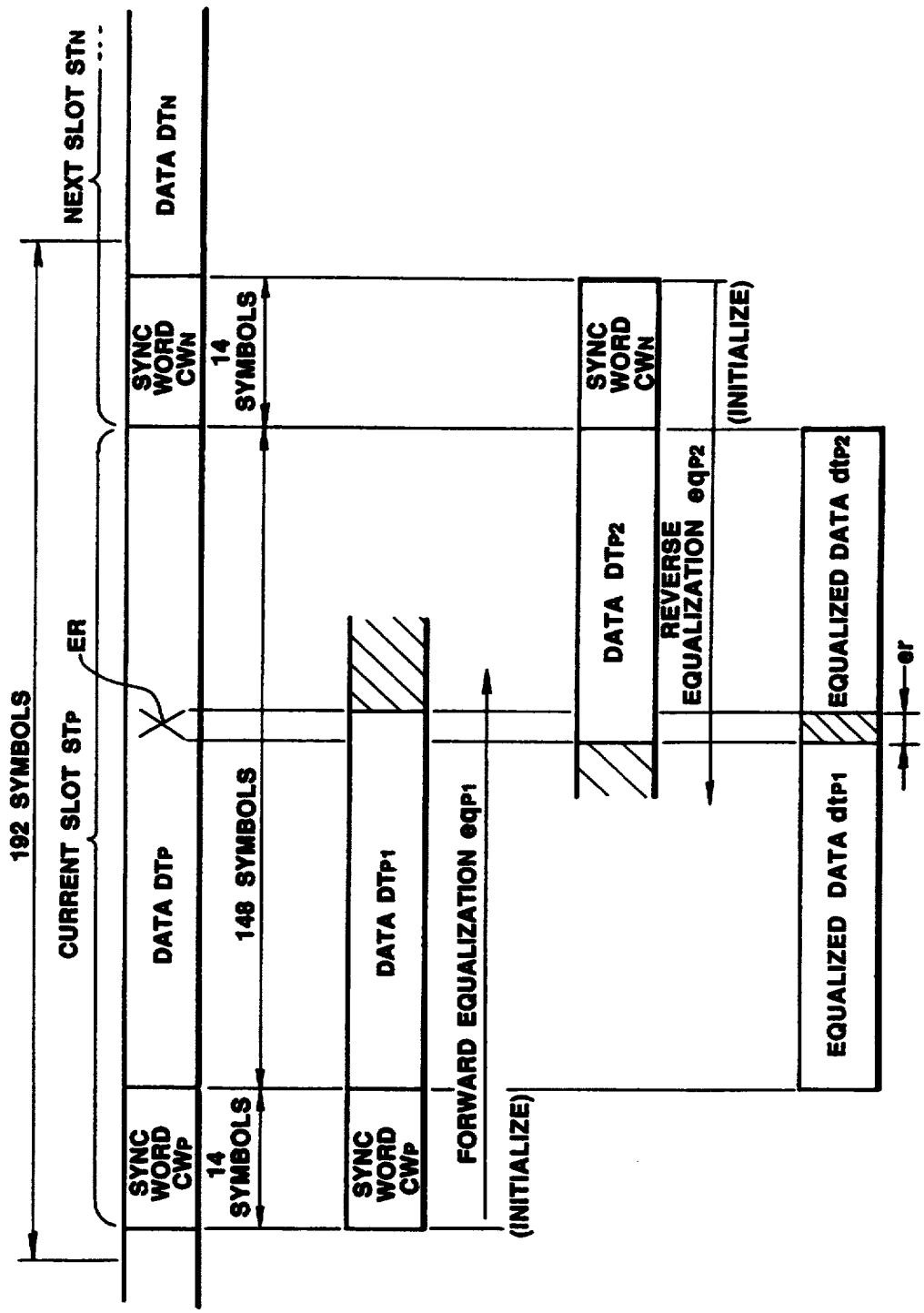
FIG. 3 is a diagrammatic view illustrating the equalizing method embodying the present invention.

In the equalizing method according to the preferred embodiment of the present invention, when equalizing the reception slot in the above-described car telephone system having the slot format shown at B in FIG. 2, by way of equalizing received transmission signals containing at least a sync word CW and arbitrary data, such as voice or other data, within a slot ST, as shown in FIG. 3, data downstream of data which is in an extremely adverse condition (i.e., an error site ER), for example, at the position within the current reception slot ($ST_P$), or data $DT_{P2}$ in a subsequent reception slot, may be equalized despite the presence of the error site ER.

According to the equalizing method of the present embodiment, should there be the error site ER in the current reception slot ($ST_P$), the data $DT_{P2}$ downstream of the error site ER is equalized in a reverse direction, by way of a reverse equalization e.g., using a sync word $CW_N$ of a slot $ST_N$ following the current slot $ST_P$, thus rendering it possible to equalize the data $DT_{P2}$ downstream of the error site ER.

Figure 4:
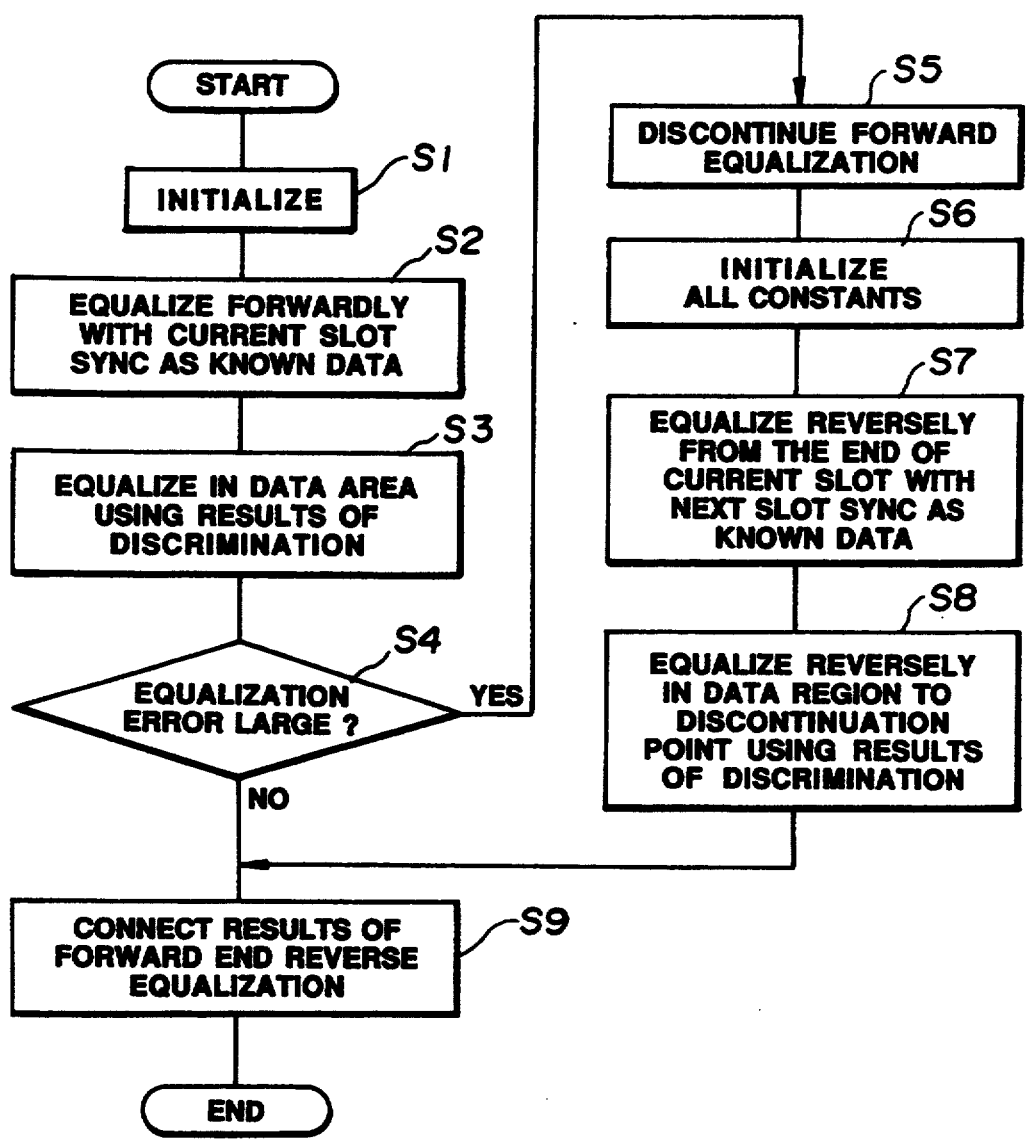
FIG. 4 is a flow chart illustrating the equalizing method embodying the present invention.

In other words, in equalizing data in cases in which the error site ER exists in the current slot $ST_P$, the equalizing method according to the present embodiment consists, as shown by a flow chart of FIG. 4 and in the reception slot diagram of FIG. 3, in a first initializing step comprising initialization in preparation for equalization, using the sync word $CW_P$ of the current slot $ST_P$ (step S1), a forward equalization step ($eq_{P1}$) comprising starting the equalization from the position of the sync word $CW_P$(step S2), the step of error detection and forward equalization discontinuation comprising discontinuing the forward equalization as soon as the error site ER is found (steps S4 and S5), a second initializing step comprising initialization using the sync word $CW_N$ of the next slot $ST_N$ subsequent to the current slot $ST_P$ (step S6), the step of reverse equalization step ($eq_{P2}$) of the current slot $ST_P$ (step S7) and the step of connecting the equalized data $dt_{P1}$, $dt_{P2}$ obtained by the forward equalization step $eq_{P1}$ and the reverse equalization step $eq_{P2}$ (step S9), respectively.

It is seen from the above that, with the equalizing method of the present embodiment, data subsequent to the position in an extremely adverse condition (error site ER), which may be present within a current reception slot $ST_P$, may be equalized. Thus, equalized data $dt_{P1}$ and $dt_{P2}$, which contain regular data except for the error data er at the error site ER as shown in FIG. 3, may be obtained subsequent to equalization of the data $DT_P$ of the current slot $ST_P$ in accordance with the present equalizing method.

The above-described equalizing method may be carried out using an arrangement such as that shown in FIG. 5.

Referring to FIG. 5, the equalizing apparatus according to the present embodiment is made up of an input buffer 10 for transiently storing at least data of the current slot $ST_P$ and the sync words $CW_N$ of the next slot $ST_N$, among digital reception signals supplied via an input terminal 1, an equalizer 11 for equalizing the supplied slot, a processing circuit 13 for calculating the equalization characteristics of the equalizer 11 and for changing the equalization characteristics of the equalizer 11, a subtractor 14 as equalized state detection means for outputting signals corresponding the equalized state of the slot, an output buffer 17 for transiently storing the output of the equalizer 11, and a control circuit 16 for detecting the error site ER in the slot based on an output signal $e_K$ from the equalized state detection means (subtractor 14) and for controlling the write/read functions of the input buffer 10 and the write/read functions of the output buffer 17.

Referring to FIG. 5, the digital signals received via input terminal 1 are stored in the input buffer 10. The input buffer 10 is capable of storing at least the current slot $ST_P$ (as illustrated in FIG. 3) which is made up of the 14-symbol sync word $CW_P$ and 148-symbol data $DT_P$ and the sync word $CW_N$ Of the next slot $ST_N$ and, specifically, has a storage capacity of, for example, 192 symbols.

The data of the current slot $ST_P$, read out from the input buffer 10, is equalized by equalizer 11. That is, the operations corresponding to steps S1 and S2 in FIG. 4 are carried out. The equalizer 11, which may comprise a transversal filter, may have its equalization characteristics changed by a processing circuit 13 adapted for calculating equalization characteristic.

It is noted that the sync word CW is previously known data as determined by the format. When the sync word CW is to be equalized by the equalizer 11, the processing circuit 13 estimates the equalization characteristics of the equalizer 11 based on an error between an output of the equalizer 11 and previously known sync word type data (sync word CW) which is generated by a data generator 21 enclosed within a control circuit 16 and which is supplied to the processing circuit 13 via a changeover switch 15 set to a fixed contact b.

When data which is not known previously, such as data DT, is to be equalized by the equalizer 11, the processing circuit 13 estimates the equalization characteristics, using the results of adjudication which are the output of the equalizer 11 processed by the data discriminator (or adjudication circuit 12. This operation corresponds to the operation performed in step S3 of the flow chart shown in FIG. 4.

Taking an example in which the received signals are previously modulated in accordance with the so-called four-phase modulation (four-phase PSK), the data discrimination circuit 12 adjudicates if the data supplied to the circuit 12 is correct data depending on which of the phases consisting of 0°, 90°, 180° or 270° the phase of the received signals in the TDMA system is in. Therefore, when the data DT is equalized by the equalizer 11, the equalization characteristics of the equalizer 11 is estimated in the processing circuit 13 on the basis of the correct data output from the data discrimination circuit 12 and supplied to the circuit 13 via the changeover switch 15 set to the fixed contact a and the output of the equalizer 11. Thus, in the data region DT, equalization in accordance with the results of the discrimination or adjudication is performed, as shown at step S3 of the flow chart shown in FIG. 4.

In order for the processing circuit 13 to carry out the calculation of equalization characteristics for sync words CW and the calculation of equalization characteristics for data DT as described above, the changeover switch 15 is changed over under control of the control circuit 16. That is, the control circuit 16 changes over the changeover switch 15 between the output of the data discrimination circuit 12 supplied to the fixed contact a of the changeover switch 15 and the previously known data from the data generator 21 supplied to the fixed contact b in accordance with data processed by the equalizer 11, in such a manner as to permit the processing circuit 13 to effect calculation of the equalization characteristics.

Meanwhile, if an error site ER exists in the current slot ST$_P$, as described above, the equalizing method of the present embodiment is carried out in the following manner in the present embodiment.

The output of the equalizer 11 and the output of the changeover switch 15, that is, the above-mentioned previously known data or the data showing the results of adjudication, are supplied to a subtractor 14, as equalized state detection means, which is adapted for outputting signals indicating the equalized state of the slot. The subtractor 14 determines the difference between the output of the equalizer 11 and the output of the changeover switch 15, that is an equalization error $e_K$. The equalization error $e_K$ is supplied to the control circuit 16.

The control circuit 16 determines that an error site ER exists when the square of the absolute value of $e_K$ exceeds a predetermined value, as quantified in formula (1).

$$|e_K|^2 \leq 0.7 \qquad (1)$$

That is, when the equalization error is found to be larger at step S4 of the flow chart of FIG. 4 (the result of step S4 is YES), an error site ER is determined to be present.

Assuming that the above-mentioned predetermined value is, for example, preferably 0.7 as shown in formula (1), the error rate may be reduced to about 2% from a value of the order of about 15%.

If the error site ER is detected by the control circuit 16, that is if the result of decision of the step S4 in the flow chart of FIG. 4 is YES, the control circuit 16 causes the forward equalization eq$_{P1}$ by the equalizer 11 to be discontinued, as shown at step S5 of FIG. 4, while causing the input buffer 10 to read data from the end of the sync word CW$_N$ of the next slot ST$_N$ subsequent to the current slot ST$_P$. In the present concrete embodiment, all the constants are initialized in this manner, using the sync word CW$_N$ of the slot ST$_N$, as shown at step S6 of FIG. 4.

By controlling data readout from input buffer 10 in the above-described manner, the data DT$_{P2}$ downstream of the error site ER of the current slot ST$_P$ is equalized in the reverse direction from its trailing end, using data beginning from the trailing end of the sync word CW$_N$ of the next slot ST$_N$ as the previously known data.

Meanwhile, during this reverse equalization, estimation of the equalization characteristics by the processing circuit 13 and adjudication by the data adjudication circuit 12 are carried out, in such a manner that the data region of the data DT$_{P2}$ is processed by reverse equalization eq$_{P1}$ as far as the error site ER, that is the point of discontinuation of the forward equalization, using the results of adjudication by the data adjudication circuit 12 (step S8 of FIG. 4).

In this manner, the data obtained by forward equalization eq$_{P1}$ and reverse equalization eq$_{P2}$ are stored in an output buffer 17 controlled as to write/readout by control circuit 16. That is, the forward equalized data and the reverse equalized data are stored in the output buffer 17, and the control circuit 16 transmits the readout addresses of the output buffer 17 in the ordinary time sequence. In this manner, data made up of interconnected equalized data dt$_{P1}$ and dt$_{P2}$, which is regular data except the small error data er corresponding to the error site ER, may be output at terminal 2, as shown in FIG. 3, in accordance with step S9 of FIG. 4.

What is claimed is:

1. An equalizing apparatus for equalizing received digital transmission signals, said transmission signals comprising a reception slot which includes a sync word and a data slot, said apparatus comprising:

an input buffer for transiently storing at least the sync word of the current reception slot, the data in the data slot of a current reception slot and the sync word of the subsequent reception slot;

an equalizer for equalizing the reception slot supplied thereto;

a processing circuit for calculating equalization characteristics of said equalizer and for changing the equalization characteristics of said equalizer;

an equalized state detection means for outputting signals corresponding to an equalized state of a current reception slot;

an output buffer for transiently storing an output of said equalizer;

a control circuit for detecting an error site in a current reception slot based on output signals from said equalized state detection means and for controlling the input buffer and the output buffer, said control circuit including a data generating means for generating a sync word based on prior sync word data and a data discriminator circuit for adjudicating whether arbitrary data in the current data slot is correct data;

a changeover switch responsive to said control circuit for transmitting to said processing circuit the prior sync word data from said data generating means when said sync word is being equalized by said equalizer, and for transmitting to said processing circuit the arbitrary data found to be correct by said data discrimination circuit when the arbitrary data in said data slot has been equalized by said equalizer, and wherein said equalized state detection means includes a subtractor for generating a difference signal indicative of the difference between the output of the equalizer and an output of said changeover switches; and said control circuit is operable to detect an error site within a reception slot when the square of the absolute value of the difference signal exceeds a predetermined value;

wherein said control circuit is operable to discontinue forward equalization starting from the sync word of the current reception slot by said equalizer on detection of said error site, and to initialize using the sync word of the reception slot subsequent and adjacent to the current reception slot from said input buffer, and thereafter perform reverse equalization starting from the trailing end of the sync word of the reception slot subsequent and adjacent to the current reception slot.

2. The equalizing apparatus as defined in claim 1 wherein said processing circuit is operable for estimating equalization characteristics of said equalizer based on an error between said prior sync word data from said data generating means and an output of said equalizer when the sync word of the current reception slot is equalized by said equalizer; said processing circuit being operable for estimating equalization characteristics of said equalizer based on an error between arbitrary data found to be correct by said data discrimination circuit and an output of said equalizer when the arbitrary data in said data slot is previously equalized by said equalizer.

3. The equalizing apparatus as defined in claim 1 wherein said predetermined value is 0.7.

4. The equalizing apparatus as defined in claim 1 wherein said equalizer is a transversal filter.

5. The equalizing apparatus as defined in claim 1 wherein said received transmission signals are four phase modulated and said data discrimination circuit is operable for adjudicating whether the arbitrary data in a reception slot is correct depending on which phase of said four phases the phase of the received transmission signals is in.

* * * * *